No. 619,345. Patented Feb. 14, 1899.
H. N. RANDALL.
CORN PLANTER.
(Application filed July 21, 1898.)
(No Model.) 3 Sheets—Sheet 2.
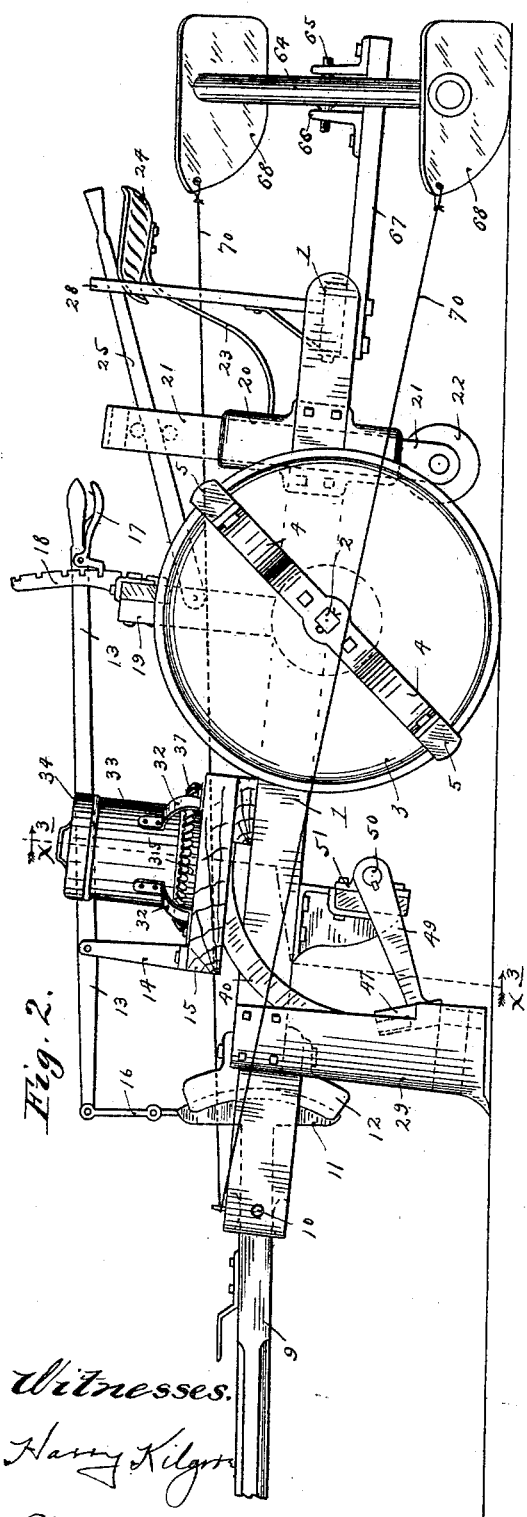
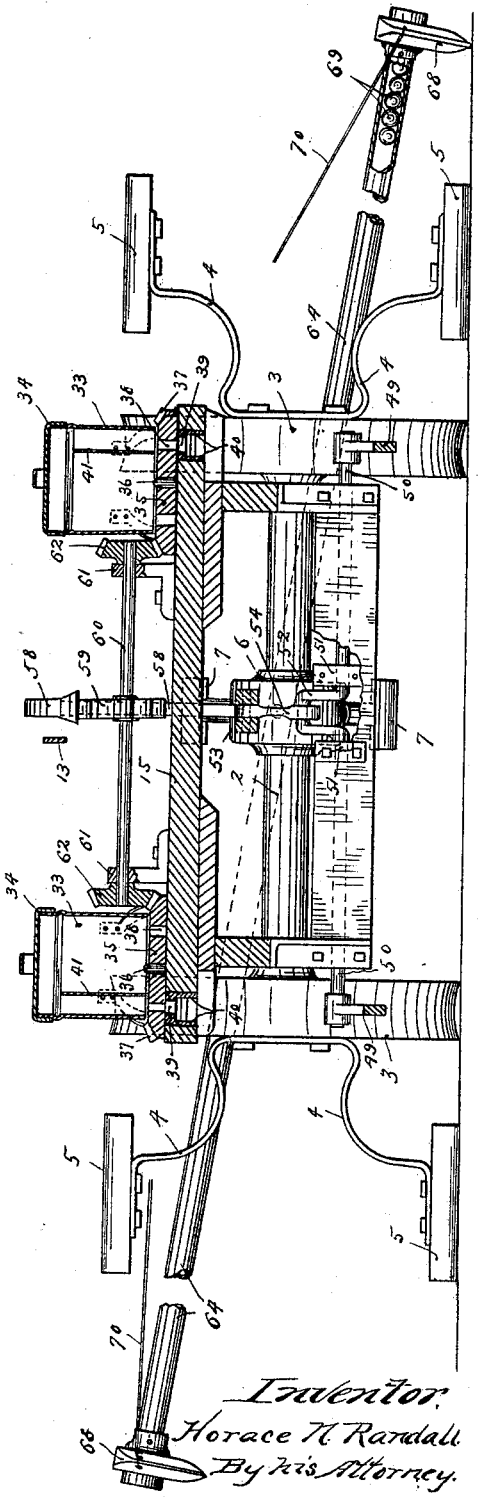
Witnesses.
Harry Kilgore
G. D. Merchant
Inventor.
Horace N. Randall
By his Attorney.
Jas. F. Williams No. 619,345. Patented Feb. 14, 1899.
H. N. RANDALL.
CORN PLANTER.
(Application filed July 21, 1898.)
(No Model.) 3 Sheets—Sheet 3.
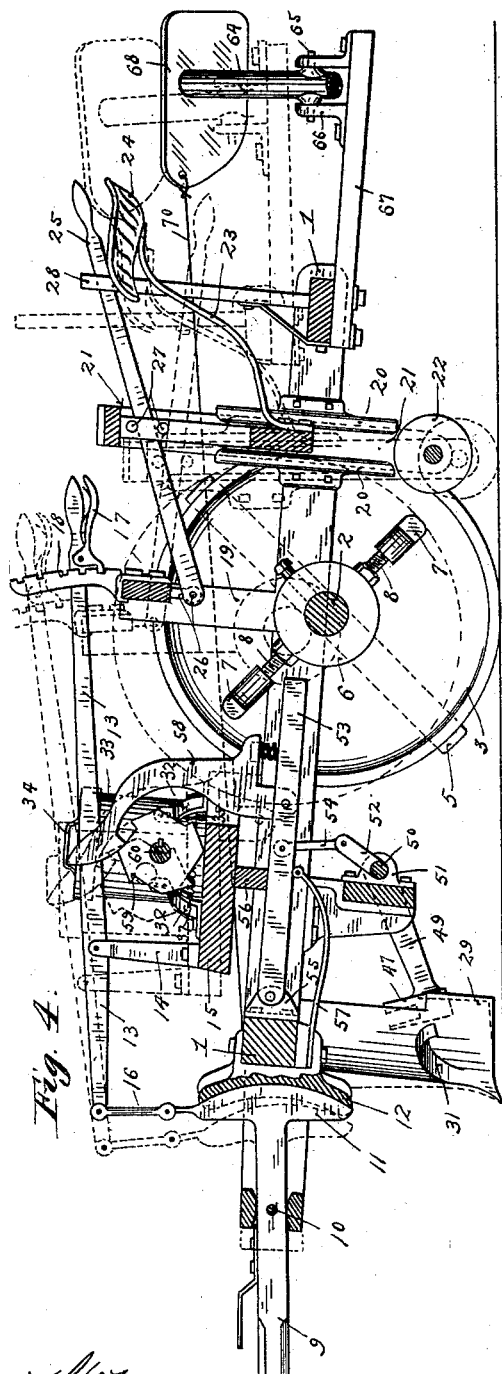
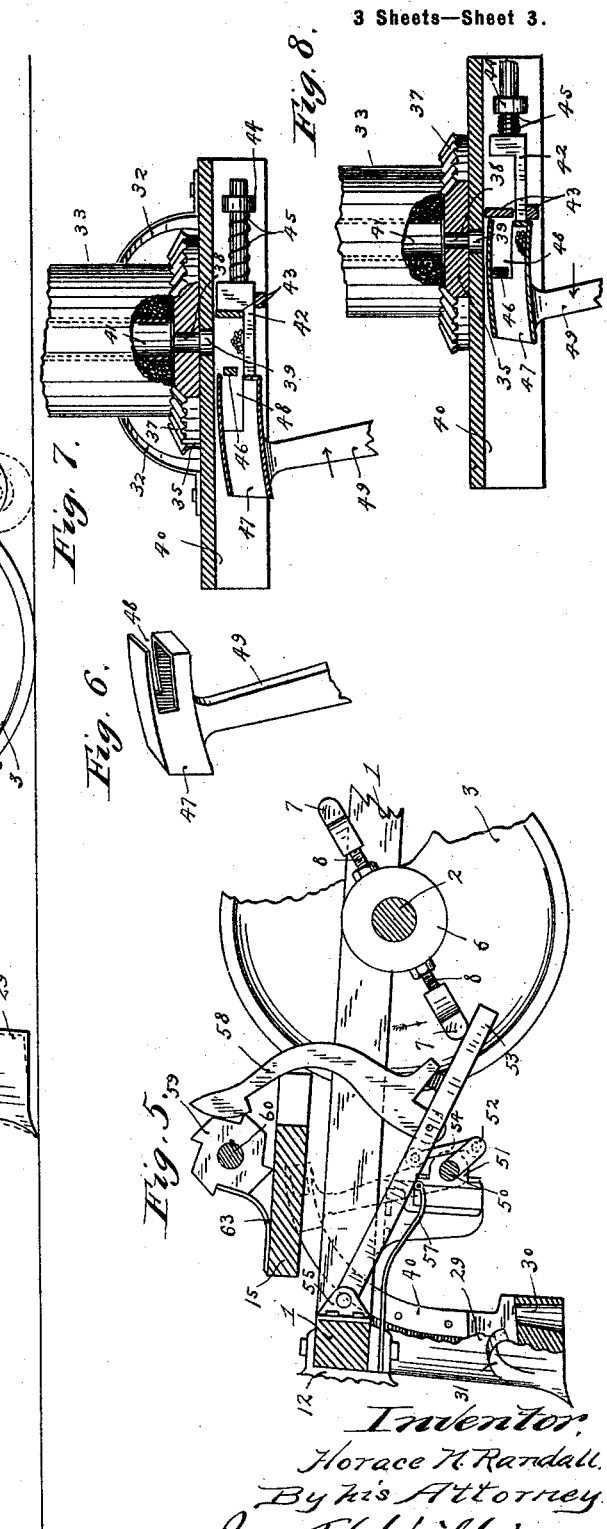
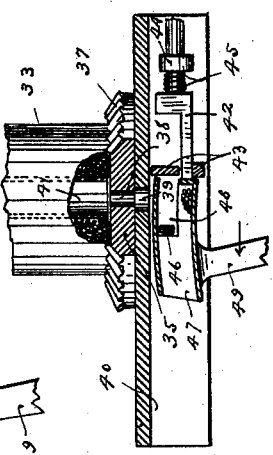
Witnesses.
Harry Kilgor
F D Merchant
Inventor,
Horace N Randall.
By his Attorney.
Jas F Williams
THE NORRIS PETERS CO., PHOTO-LITHO., WASHINGTON, D. C.

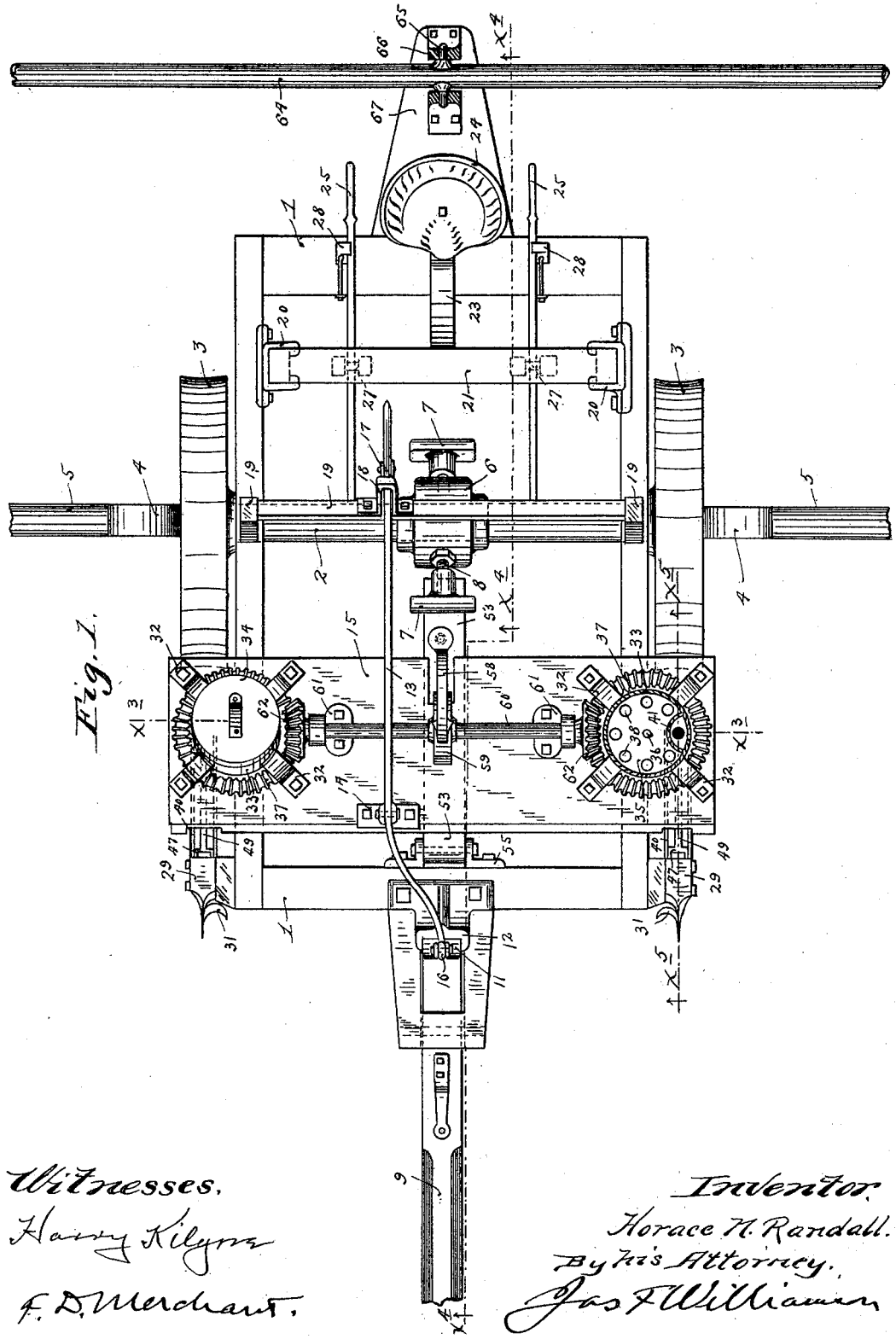

UNITED STATES PATENT OFFICE.

HORACE N. RANDALL, OF TRACY, MINNESOTA.

CORN-PLANTER.

SPECIFICATION forming part of Letters Patent No. 619,345, dated February 14, 1899.

Application filed July 21, 1898. Serial No. 686,538. (No model.)

*To all whom it may concern:*

Be it known that I, HORACE N. RANDALL, a citizen of the United States, residing at Tracy, in the county of Lyon and State of Minnesota, have invented certain new and useful Improvements in Corn-Planters; and I do hereby declare the following to be a full, clear, and exact description of the invention, such as will enable others skilled in the art to which it appertains to make and use the same.

My invention relates to planters, and has for its especial object to provide an improved machine of that class particularly adapted for planting corn.

To these ends my invention consists of the novel devices and combinations of devices hereinafter described, and defined in the claims.

The general construction and actions of the ordinary so-called "check-row planters" are well understood. They usually employ a wire or line which is run across the entire field and operates on the seed-releasing devices of the machine to cause the same to drop the grain or seed at intervals, which, according to the intention, will bring the hills of the field in line with each other in two directions. However, in practice it so happens that the machine will not always be run on a perfectly straight line, but will swerve from side to side, with the result that in long rows the hills will be located transversely in zigzag lines.

In my invention I provide mechanism which is operated without the usual wire or line extended across the field and which is capable of correction or resetting at any time, so as to prevent the hills from being planted to any material extent transversely out of line with each other.

The preferred form of my improved machine is illustrated in the accompanying drawings, wherein like characters indicate like parts throughout the several views.

Figure 1 is a plan view of the machine. Fig. 2 is a left side elevation of the same. Fig. 3 is a transverse vertical section taken approximately on the lines $x^3 x^3$ of Figs. 1 and 2. Fig. 4 is a longitudinal vertical section taken approximately on the irregular line $x^4 x^4$ of Fig. 1. Fig. 5 is a longitudinal vertical section of a portion of the machine shown in Fig. 1, some parts being broken away and others removed. Fig. 6 is a perspective view of one of the seed-delivery shuttles; and Figs. 7 and 8 are longitudinal sections of one of the seed-containing magazines and certain other portions which in Fig. 5 are removed, their section being taken approximately on the line $x^5 x^5$ of Fig. 1.

1 indicates the main frame of the machine, which is provided with a loose axle 2, on which traction-wheels 3 are rigidly secured. These traction-wheels 3 are provided with outwardly-projecting spring-arms 4, that project in diametrically opposite directions from each other and are provided at their free ends with transverse markers or feet 5, the outer faces of which extend parallel to the shaft 2 and in line with or slightly outward of the peripheries of said wheels 3. The corresponding markers 5, carried by the opposite wheels, stand in line with each other. Normally the main load of the machine is taken on the traction-wheels 3. At its central or intermediate portion the axle 2 is provided with a hub 6, from which trip projections 7 project in diametrically opposite directions. In order to properly adjust the trip projections 7 for a proper action, hereinafter to be noted, I provide the same with screw-threaded stems 8.

The tongue or pole 9 is attached to the forward part of the frame 1, this connection, as shown, being accomplished by a transversely-extended pivot-bolt 10 and by the engagement of a segmental head 11 on said pole with a segmental seat 12 on said frame.

The forward portion of the machine is tilted or raised and lowered on the axle 2 as a fulcrum by means of a hand-lever 13, pivoted to a bracket 14 on a transversely-extended timber 15 on the frame 1. The forward end of this lever 13 is connected to the segmental head 11 of the tongue 9 by a link 16, and its rearwardly-projecting free end is provided with a spring-latch 17, that coöperates with a lock-segment 18 on a vertical extension 19 of the frame 1 to hold said lever 13 wherever set.

In a pair of vertically-extended guides or keepers 20, secured to the frame 1 to the rear of the axle 2, a vertically-movable frame 21 is mounted to move. The lower portions of this vertically-movable frame 21 are provided with a pair of ground-wheels 22. As shown, the spring-support 23 for the seat 24 is secured to the movable frame 21.

25 indicates a pair of lifting-levers that are pivoted at their forward ends to parts 26 on the frame extension 19 and work between bolts or pins 27 on the movable frame-section 21. The free rear ends of these levers 25 are adapted to be secured wherever set with respect to the main frame 1 by means of notched lock-bars 28, that project vertically from and are rigidly secured to a transverse rear timber of said main frame.

The furrow-forming shoes, of which there are two, are spaced apart from each other the distance of the width of the desired space between rows and are rigidly secured to and depend one from each forward corner of the main frame 1. These shoes 29 are open at their rearward portions, but are provided with vertical perforations 30 through their bottoms. 31 indicates curved finger-like projections which extend outward from the shoes and are adapted to force grass or loose material to one side of the furrow. A corresponding pair of seed-containing magazines are secured to the opposite sides of the machine, as shown, by legs 32, that project from the cylindrical bodies 33 of said magazine and are themselves secured to the transverse frame-timber 15. As shown, these magazines are provided with removable tops or covers 34. These magazines are further provided with disk-like bottoms 35, that are mounted for rotary movement on short vertical studs 36. Outside of the magazine these rotary bottoms 35 are provided with annular beveled gears 37, and within said magazines said bottoms 35 are provided with annular series of seed pockets or perforations 38, that are adapted to be brought into registration in succession with perforations 39, formed in longitudinally-extended channel-irons 40. These channel-irons 40 are shown as embedded in the transverse timber 15 of the main frame and extend parallel to each other, one under each rotary bottom 35. The magazines 33 are provided with interior bulges or trough-like sections 41, which extend vertically over the seed passages or perforations 39 in the angle-irons 40. The bottoms of these bulges 41 act as strikers to level off the load of seed contained in the pockets 38 as they are passed thereunder.

Immediately below each perforation or passage 39 is a plunger or receiving-table 42, which is mounted in suitable keepers or guides 43 44 and is pressed forward by a spring 45. A receptacle adapted to contain a small quantity of seed is thus formed by the lower part of the plunger 42, which serves as its bottom, the sides of the channel-iron 40, which furnishes two sides, and the upper portion of the bearing 43, which constitutes one end thereof. The other or forward end of the receptacle thus formed is partially closed by a transversely-extended fixed bar 46.

A pair of vibrating shuttles or seed-delivery heads that are mounted to move in vertical planes coöperate one with each of the magazines and corresponding shoes. As shown, these shuttles or heads are in the form of hollow and approximately cubical bodies 47, the forward ends of which are entirely open and the rear ends of which are slotted transversely, as shown at 48, so as to pass or permit the entrance of the coöperating fixed cross rods or bars 46. These shuttles or heads 47 are carried at the free ends of arms 49, that are fixed on a transversely-extended rock-shaft 50, mounted in suitable bearings 51, depending from the main frame 1. The rock-shaft 50 has a crank-arm 52 at its intermediate portion, which is connected to the intermediate portion of a trip-lever 53 by means of a short link 54. The trip-lever 53 is pivoted at its forward end to bearing-brackets 55 on the forward portion of the machine, and it is normally held upward to its limit against a fixed stop 56 by means of a strong leaf-spring 57. The rearwardly-projecting free end of the trip-lever 53 is adapted to be struck and forced downward by the engagement therewith of the trip projections 7, carried by the axle 2.

The trip-lever 53 carries a large pawl 58, which works over the teeth of a ratchet-wheel 59 on the intermediate portion of a transversely-extended shaft 60, mounted in bearings 61 on the transverse frame-timber 15. At its ends this shaft 60 is provided with beveled pinions 62, that are in mesh one with each of the beveled gears 37. A leaf-spring 63 acts on the ratchet-wheel 59 as a retaining-pawl to prevent return movement thereof.

In connection with the mechanism described or in connection with other suitable mechanism I employ a marking device, which in its preferred form consists of a transversely-extended tube 64, which is provided at its intermediate portion with small trunnions 65, that engage bearing-lugs 66 of a rearwardly-projecting portion 67 of the main frame. At its ends this tube is provided with markers 68, that have very much the form of a sled-runner. Within the tube 64 I place a number of metallic balls 69. Shot will answer the same purpose as the metallic balls 69. Guy ropes or stays 70 extend from the forward portions of the markers 68 to a forward portion of the machine. The tube 64 is pivoted for a seesaw movement over a fulcrum that is located a considerable distance above the ground, so that the balls 69 will run to that end of the tube 64 which has its shoe thrown into contact with the ground. The weight of the balls 69 or of the shot will be sufficient to cause the marker or shoe 68 which is thrown down to produce a visible mark on the ground over which it is run. The machine of course plants two rows at a time. The markers 68 are projected outward from the center of the machine such distances that when the line marked thereby on one trip of the machine is straddled by the horses, or, in other words, followed by the pole on the return trip, the four rows produced by the two trips will be spaced apart equal distances. As is obvious, on the reverse trips the opposite markers 68 must be used in order to produce a line or mark on that side of the machine which is outward from the planted side of the field. This may be very readily and quickly accomplished by the operator simply by pressing the proper end of the tube 64 downward, so as to permit the balls or shot 69 to run toward the marker 68 which it is desired to throw into action.

The transverse or hill markers 5 will produce transversely-extended marks on a line midway between the inside row which is being planted and the last or outermost row planted on the previous trip on the one side of the machine, and on the other side of the machine said hill-markers 5 will produce the transverse marks midway between the outermost row which is being planted and the innermost row to be planted on the next succeeding or return trip. Inasmuch as there are two of these hill-markers 5 on each driving-wheel and two trip projections 7 carried by the driving-axle 2, it is obvious that these hill-markers 5 will indicate the distances between hills of a given row, or, in other words, will indicate the intervals of space between the said hills.

When the hills planted on one trip are in true transverse line with the hills that are being planted, the transverse markers 5 which project from that side of the machine which is toward the previously-planted rows should fall into or register with the transverse marks made by the previous trip. Whenever they commence to work out of line or registration with these previously-made hill-marks, the operator will know that the machine is planting its hills either in advance or to the rear of the lines formed transversely of the field or at right angles to the machine's travel by the previously-planted rows. When this is noticed, the machine may be very readily reset, either forward or backward, into proper position by the operator, who by means of the levers 25 may force the truck or vertically-movable wheeled frame 21 22 downward into contact with the ground and the traction-wheels 3 and other parts of the machine upward, as indicated by dotted lines in Fig. 4. The traction-wheels 3 being thus freed from the ground may be readily turned forward or backward, so as to bring the hill-markers 5 into proper relation with respect to the planted hills. It is of course obvious that in starting a row the wheel 3 and markers 5 are primarily set, as above described.

When the machine is advanced, the trip projections 7 will be successively brought into action upon the free end of the trip-lever 53 and force the same downward against the action of the spring 57, as previously indicated. The initial downward movement of this lever 53 will cause the pawl 58 to act upon the ratchet-wheel 59, and thus move the rotary magazine-bottoms 35 one step in advance, so that one of the filled pockets 38 will be moved under the striker 41 and into registration with the perforation 39 in the channel-iron 40. As this movement is completed the free end of the pawl 58 will crowd itself out of action on the ratchet-wheel 59. The seed thus delivered to the perforation 39 will fall onto the lower portion of the receiving-table or plunger 42. The downward movement of the trip-lever 53 will raise the shuttles 47 and their arms 49, and immediately after the seeds have been dropped onto the receiving-tables 42 said shuttles 47 will be thrown into engagement with the coöperating tables 42, as shown in Fig. 7, and the continued movement thereof will force said tables or plungers into their retracted positions. (Shown in Fig. 8.) Under this movement the tables 42 are caused to drop their loads into the shuttles 47. When the trip projection 7 passes off from the end of trip-lever 53, the spring 57 will immediately become effective to throw said lever upward and said shuttles 47 and their arms downward into contact with the bottoms of the coöperating shoes 29. Under these downward movements of the shuttles the loads of seed will be thrown or shot, as it were, through the perforations 30 in the bottoms of the shoes and into the ground beneath the shoes. This insures the proper location of the seeds, prevents scattering of the same, and insures deep planting. The furrow over the planted seeds is covered or closed by the traction-wheels 3, which, as preferred and shown, are provided with slightly-concave peripheries.

It will of course be understood that I do not limit myself to the details of construction above specifically described, but, on the contrary, that my invention is capable of many modifications as to these details.

What I claim, and desire to secure by Letters Patent of the United States, is as follows:

1. In a planter, the combination with a seed magazine or receptacle, of a vibrating feed shuttle or head movable to and from said magazine, and arranged to deliver the seed from said magazine to the ground with a shooting action, substantially as described.

2. In a planter, the combination with a seed magazine or receptacle, and a shoe, of a vibrating shuttle or head arranged to receive seeds discharged from said magazine, and to deliver the same to the ground in the vicinity of said shoe, substantially as described.

3. In a planter, the combination with a seed magazine or receptacle arranged to drop small loads of seed at intervals, a receding platform or plunger receiving the seeds dropped from the magazine, and a vibrating shuttle or head operating on said platform or plunger and receiving the load therefrom, and then delivering said seed to the ground substantially as described.

4. In a planter, the combination with a seed magazine or receptacle provided with a rotary bottom through which small loads of seed are dropped at intervals, receding platforms or plungers positioned to catch and temporarily hold the seeds dropped from said magazine, a vibrating shuttle or head working between said receiving-platform and said shoe and receiving the seed from said platform, a spring tending to force said shuttle or head toward said shoe, and a trip operated by the advance movement of the machine, to force said shuttle or head into action upon said platform or plunger, and then to release the same, substantially as described.

5. In a planter or similar machine, a marking device comprising a transverse bar or rod pivoted at its intermediate portion and provided with markers at its ends, and a weight shiftable from one side to the other of the pivot of said transverse bar or rod, to throw one or the other of said markers into action, substantially as described.

6. In a planter or similar machine, a marking device comprising a transversely-extended tubular bar or rod, pivoted at its intermediate portion, and provided, at its ends, with markers, and shot or other weighting device contained within said tubular bar and adapted to run to whichever end thereof is lowered, substantially as and for the purposes set forth.

In testimony whereof I affix my signature in presence of two witnesses.

HORACE N. RANDALL.

Witnesses:
CHAS. W. MAIN,
O. L. PATTRIDGE.